United States Patent
Neider et al.

(10) Patent No.: US 10,696,170 B2
(45) Date of Patent: Jun. 30, 2020

(54) METHOD FOR CHANGING VEHICLE ENERGY STORES, AND AN ENERGY STORE CHANGING DEVICE

(71) Applicant: KUKA Systems GmbH, Augsburg (DE)

(72) Inventors: Reinhold Neider, Langweid (DE); Stefan Mayr, Friedberg (DE)

(73) Assignee: KUKA Systems GmbH, Augsburg (DE)

( * ) Notice: Subject to any disclaimer, the term of this patent is extended or adjusted under 35 U.S.C. 154(b) by 216 days.

(21) Appl. No.: 15/535,903

(22) PCT Filed: Dec. 11, 2015

(86) PCT No.: PCT/EP2015/079480
§ 371 (c)(1),
(2) Date: Jun. 14, 2017

(87) PCT Pub. No.: WO2016/096670
PCT Pub. Date: Jun. 23, 2016

(65) Prior Publication Data
US 2018/0354378 A1  Dec. 13, 2018

(30) Foreign Application Priority Data

Dec. 18, 2014 (DE) .................. 10 2014 226 372

(51) Int. Cl.
| | | |
|---|---|---|
| *B25J 15/00* | (2006.01) | |
| *B60L 11/18* | (2006.01) | |
| *B60S 5/06* | (2019.01) | |
| *B25J 11/00* | (2006.01) | |
| *B60L 53/80* | (2019.01) | |
| *B60L 50/60* | (2019.01) | |
| *B60L 53/60* | (2019.01) | |
| *B60S 3/00* | (2006.01) | |
| *B60K 1/04* | (2019.01) | |
| *B60K 6/20* | (2007.10) | |

(52) U.S. Cl.
CPC .......... *B60L 11/1822* (2013.01); *B25J 11/00* (2013.01); *B25J 15/00* (2013.01); *B60L 50/66* (2019.02); *B60L 53/60* (2019.02); *B60L 53/80* (2019.02); *B60S 3/00* (2013.01); *B60S 5/06* (2013.01); *B60K 1/04* (2013.01); *B60K 6/20* (2013.01); *B60K 2001/0455* (2013.01); *B60Y 2200/91* (2013.01); *B60Y 2200/92* (2013.01); *Y02T 10/705* (2013.01); *Y02T 10/7005* (2013.01); *Y02T 10/7072* (2013.01); *Y02T 90/121* (2013.01); *Y02T 90/124* (2013.01); *Y02T 90/128* (2013.01); *Y02T 90/14* (2013.01); *Y02T 90/163* (2013.01)

(58) Field of Classification Search
None
See application file for complete search history.

(56) References Cited

U.S. PATENT DOCUMENTS

| | | | |
|---|---|---|---|
| 5,612,606 | A | 3/1997 | Guimarin et al. |
| 8,957,626 | B2 | 2/2015 | Lombarte |
| 2008/0294283 | A1 | 11/2008 | Ligrano |
| 2010/0145717 | A1 | 6/2010 | Höltzel |
| 2010/0292877 | A1 | 11/2010 | Lee |
| 2011/0113609 | A1* | 5/2011 | Berdelle-Hilge ....... B60L 53/60 29/426.1 |
| 2011/0123309 | A1* | 5/2011 | Berdelle-Hilge ........ B60K 1/04 414/800 |
| 2011/0303509 | A1 | 12/2011 | Agassi et al. |
| 2012/0110831 | A1 | 5/2012 | Escande |
| 2013/0226345 | A1 | 8/2013 | Zhao |
| 2013/0282472 | A1* | 10/2013 | Penilla .................. B60L 53/305 705/14.35 |
| 2014/0092236 | A1 | 4/2014 | Findeisen et al. |

FOREIGN PATENT DOCUMENTS

| | | |
|---|---|---|
| CN | 102717778 A | 10/2012 |
| CN | 103359076 A | 10/2013 |
| CN | 103359078 A | 10/2013 |
| CN | 203391745 U | 1/2014 |
| CN | 103712556 A | 4/2014 |
| DE | 112012004251 T5 | 8/2014 |
| DE | 102013016796 A1 | 4/2015 |
| EP | 0575864 A2 | 12/1993 |
| EP | 2463162 A2 | 6/2012 |
| FR | 2960500 A1 | 12/2011 |
| JP | H0648184 A | 2/1994 |
| JP | 2010526697 A | 8/2010 |
| JP | 2011518710 A | 6/2011 |
| JP | 2011189909 A | 9/2011 |
| JP | 2012531342 A | 12/2012 |
| JP | 2013169868 A | 9/2013 |
| WO | 2010033883 A1 | 3/2010 |
| WO | 2010105083 A1 | 9/2010 |
| WO | 2013127020 A1 | 9/2013 |
| WO | 2013144948 A1 | 10/2013 |
| WO | 2013144953 A1 | 10/2013 |
| WO | 2013144954 A1 | 10/2013 |
| WO | 2013144958 A1 | 10/2013 |

OTHER PUBLICATIONS

Japanese Patent Office; Examination Report in related Japanese Patent Application No. 2017-550994 dated Jul. 4, 2018; 5 pages.

(Continued)

*Primary Examiner* — Ladan Mohaddes

(74) *Attorney, Agent, or Firm* — Dorton & Willis, LLP

(57) ABSTRACT

A method for changing at least one energy store of a vehicle and an energy store changing apparatus. The method includes steps for ascertaining the vehicle type and the provision of vehicle data relating to the ascertained vehicle type. The vehicle data includes data about the arrangement of the energy store in the vehicle. The position of the vehicle is ascertained on the basis of at least one physical reference point, and at least one energy store of the vehicle is changed.

16 Claims, 3 Drawing Sheets

(56) References Cited

OTHER PUBLICATIONS

German Patent Office; Office Action in German Patent Application No. 10 2014 226 372.7 dated Nov. 12, 2016; 12 pages.
European Patent Office; Search Report in International Patent Application No. PCT/EP2015/079480 dated Mar. 17, 2016; 4 pages.
Chinese Patent Office; Examination Report in related Chinese Patent Application No. 201580068858.4 dated Nov. 2, 2018; 6 pages.
Chinese Patent Office; Search Report in related Chinese Patent Application No. 201580068858.4 dated Oct. 15, 2018; 3 pages.

* cited by examiner

METHOD FOR CHANGING VEHICLE ENERGY STORES, AND AN ENERGY STORE CHANGING DEVICE

CROSS-REFERENCE

This application is a national phase application under 35 U.S.C. § 371 of International Patent Application No. PCT/EP2015/079480, filed Dec. 11, 2015 (pending), which claims the benefit of German Patent Application No. DE 10 2014 226 372.7 filed Dec. 18, 2014, the disclosures of which are incorporated by reference herein in their entirety.

TECHNICAL FIELD

The invention relates to a method for changing at least one energy store of a vehicle via an energy store changing device, and a method which allows a quick change of the energy store of an at least partially electrically operated vehicle.

BACKGROUND

Electrically operated vehicles or partially electrically operated vehicles, such as hybrid vehicles, become increasingly important. These vehicles are characterized by low noise emissions and low exhaust emissions, which is advantageous particularly in urban areas. Additionally, electrically operated vehicles allow the use of renewable energies for transportation purposes. This way, the $CO_2$-emission can be reduced.

However, purely electrically operated vehicles are presently less suited for longer distances due to the short range and the relatively long charging periods of the energy storage units, such as batteries. Therefore, vehicle manufacturers of electrically operated vehicles frequently equip them with an additional internal combustion engine (hybrid vehicles). This allows purely electric driving modes with limited range and then, in case of the electric store being discharged, for example, switching to operation via the internal combustion engine. Today, purely electrically operating vehicles are limited in their range and require a charging period of several hours. Therefore, these purely electrically operating vehicles are suitable particularly for inner-city use and for commuters.

In order to expand the operational area of electrically operated vehicles, it is necessary to avoid the disadvantage of long charging periods of the energy stores. For this purpose, there are concepts, known as changing stations, which allow the simple and quick exchange of discharged energy stores of the vehicle for a charged energy store. The discharged energy store can then be recharged in a conventional fashion, thus over a period of several hours. Thus, the long charging period of the energy store is no longer connected to the operation of the vehicle and, after the exchange of the energy storage unit, the vehicle is immediately ready for further driving.

SUMMARY

The objective of the present invention is to provide an improved method and an improved energy store changing device in order to allow a quick and secure change of the energy store/stores of a vehicle.

The above-mentioned objectives are attained by an inventive method for changing at least one energy store of a vehicle and by an energy store changing device as disclosed herein.

In particular, the above-mentioned objectives are attained by a method for changing at least one energy store of a vehicle, comprising the following processing steps:

Determining the vehicle type;
Providing vehicle data of the determined vehicle type, comprising data regarding the arrangement of at least one energy store in the vehicle;
Determining spatial reference points on the vehicle based on the vehicle data of the determined vehicle type;
Determining the present position of the vehicle based on at least one spatial reference point;
Changing at least one energy store of the vehicle to be changed.

The method for changing at least one energy store of a vehicle allows a quick change of the energy store for any arbitrary vehicle types. By detecting the vehicle type and providing vehicle data of the determined vehicle type, the change of the energy store is also possible when the arrangement of the energy store in the vehicle is not implemented uniformly for different vehicle types. The method is therefore independent of a specific vehicle type and additionally, it can be adapted easily to new vehicle types.

Energy stores are devices which accept energy with the goal of electric, chemical, electrochemical, mechanic, and/or thermal storage thereof, and rendering it available for a delayed use. Preferably, the energy accepted is provided to be used in the form of electric energy. Particularly preferred energy stores are accumulators, batteries, or capacitors. Energy stores can furthermore represent a combination of a plurality of energy stores, which are combined to form a comprehensive energy storage unit. For example, an energy store may comprise a plurality of rechargeable batteries (accumulators) in order to provide higher storage capacity or higher energy release potential.

The determination of the vehicle type can occur, for example, by a visual detection unit, comprising a camera and an image analysis system. Furthermore, the vehicle type can be read from a storage medium, with said storage medium preferably being a RFID [Radio-frequency identification]-chip, which can, for example, be fastened to the vehicle itself or can be arranged in a mobile fashion. Additionally, the readable storage medium may be integrated in a chip card or the vehicle key. Furthermore, the determination of the vehicle key shall also be possible via an input device, which allows the user the option to manually enter the vehicle type.

Providing vehicle data can occur before, during, or after the determination of the vehicle type and in a plurality of manners. The vehicle data can, for example, be recalled online during every process or saved in advance. The saving and/or storage of the vehicle data can occur in a central server, which several energy store changing devices can access, or on a local storage unit of the energy store changing device. Additionally, the data may be saved, etc. together with the vehicle type on the readable storage medium.

Data regarding the arrangement of at least one energy store can, in addition to position and orientation information of the energy store in or on the vehicle, thus the energy store coordinates, also include information regarding the type and design of the energy store cover and the locking of the energy store in or on the vehicle. The information regarding the type and design of the energy store cover and the locking of the energy store includes, for example, the number of screws and their type used for locking. Different locking methods are also possible, such as bayonet locks or other fastening systems using sliding latches.

The determination of the spatial reference points of the vehicle occurs "offline". Based on the vehicle data, the approximate position is determined of at least one reference point in the coordinate system of the energy storing change device such that it can be used in a next step to determine the precise and real position of the vehicle.

The reference points are dependent on the vehicle type and are preferably allocated to easily measured contours of the vehicle.

The determination of the current position of the vehicle, based on at least one spatial reference point, can occur, for example, by optic systems, such as camera systems. In general, one reference point is sufficient for determining the position of the vehicle. Using several reference points is, however, beneficial by allowing a more precise determination of the vehicle position.

Preferably the determination of the present position of the vehicle occurs by approaching at least one spatial reference point via tactile measuring means. The tactile measuring means preferably represent a tactile manipulator. A manipulator is here an automatically guided, multipurpose manipulator equipped with three or more freely programmable axes of motion, which can be used either in a stationary or mobile fashion. A tactile manipulator is a manipulator equipped with sensors, which allow, for example, the determination of forces and/or moments acting upon the axes of the manipulators. Preferably the tactile manipulator is a tactile articulate manipulator and/or robot.

The determination of the current position via tactile measuring means is advantageous since reference points can also be approached or detected when disadvantageous lighting conditions are given or the reference points are covered by soiling. Additionally, approaching at least one reference point represents a very precise possibility to determine the position of at least one reference point. From the position of the reference point, in another step, the portion of the vehicle can be determined in the coordinate system of the energy store changing device and thus also the precise position and orientation of the energy store to be changed.

Preferably the determination of the current position of the vehicle occurs by approaching at least one spatial reference point via a tactile manipulator, with the tactile manipulator comprising at least one measuring body, which has at least two contact areas, and the method further comprising at least the following processing steps: Approaching the spatial reference point via the measuring body of the tactile manipulator; and aligning the measuring body to a contour of the vehicle allocated to said reference point such that at least two contact areas come into contact with respective areas of the contour.

By designing the measuring body with at least two contact areas not only the position of the reference point can be determined but also its orientation. The contact areas are advantageously arranged such that they match a suitable contour of the vehicle and can be inserted or abutted thereto in a form-fitting fashion, for example. Suitable contours may, for example, be provided at the undercarriage of the vehicle, at the axles of the vehicle, or at the brake disks, as well as the wheels of the vehicle. The method is, however, not limited to the use of these contours. Preferably, the measuring bodies are designed such that the alignment of the measuring body is independent from the vehicle type and the measuring body. Alternatively, for different vehicle types, here different measuring bodies may be provided as well. In this case, dependent on the vehicle data determined, the tactile manipulator must be provided to a measuring body allocated to the vehicle.

Preferably, when approaching the spatial reference point, the contacting force between at least one reference point and the measuring body is determined via a tactile manipulator. By determining the contacting force, the correct alignment of the measuring body can be determined and/or controlled. Here, monitoring the contacting force is also advantageous because damages at the vehicle can be prevented by cancelling the approach of at least one reference point when a certain value of the contacting force is exceeded.

Furthermore, manipulators and, in particular, tactile manipulators can preferably assume additional tasks during the change of the energy store of the vehicle, which are described in the following. By utilizing tactile manipulators for some processing steps, the design of the energy store changing device can be kept "sleek" and/or show a space-saving design.

Preferably, the method for changing at least one energy store of a vehicle also comprises the following processing steps:

Releasing a lock which is allocated to the energy store to be changed using a locking and/or unlocking unit, with the locking and/or unlocking unit preferably representing a tactile manipulator; locking the locking device, which is allocated to a charged energy store, using the locking and/or unlocking device. After loosening the lock, the energy store can be removed from the vehicle. The locking ensures that the newly inserted, charged energy store is anchored securely in or on the vehicle.

In general, it is preferred that the method for changing an energy store of a vehicle further comprises a cleaning process of the electric contacts of the vehicle, which serve for the electric contacting of the energy store to the vehicle, using a manipulator and, preferably, a tactile manipulator.

The cleaning of the electric contacts of the vehicle serves to prevent any corrosion and to securely provide electric contacting of the energy store with the vehicle. The cleaning may also comprise, in addition to the mere removal of contaminants, the treatment of the contacts of the vehicle with suitable means, such as contact grease.

Preferably, the method for changing an energy store of a vehicle also comprises the connection of the vehicle to an on-grid energy source, namely prior to the change of at least one of the energy stores of the vehicle to be changed. Due to the fact that after the removal of the energy store to be changed, under certain circumstances, briefly insufficient energy sources are available, it is advantageous prior to removing the energy store to provide an alternative energy source in order to allow continuous supply of energy to the on-board power system.

The on-grid energy source is typically the general electric grid. The connection of the on-grid energy source to the vehicle can occur via a cable and via a manipulator, preferably a tactile manipulator. Alternatively, the energy of the electric grid can also be supplied to the vehicle in a wireless fashion, for example via induction.

Preferably, the method also includes a cleaning process of at least the section of the vehicle in which the energy store shall be removed and a drying of the area before changing the energy store. By the cleaning process, contaminants are removed from the reference points and the locks and, this way, the referencing and releasing of the locks is facilitated. Furthermore, this way, it is prevented that the energy store fastener and the electronic contacts, respectively, are soiled during the changing process. The drying of the area is advantageous in order to prevent any short-circuitry or leaking current in the proximity of the electric contacts due to moisture. Additionally, here, the corrosion of the contacts can be prevented.

The energy store changing device for changing at least one energy store of a vehicle comprises:

A detection unit which is implemented to determine the vehicle type;

A data provision device which is implemented to provide vehicle data of the vehicle type to be determined, comprising data regarding the arrangement of the energy store in the vehicle;

A determination unit which is implemented to determine the spatial reference points on the vehicle based on vehicle data of the vehicle type determined;

Measuring means which are implemented to determine the current position based on at least one reference point of the vehicle; and An energy store changing device, which is implemented to change at least one energy store of the vehicle to be changed.

An energy store changing device, which prior to the actual change of the energy store determines the vehicle type of the vehicle, is advantageous because this way, the arrangement of the energy store in the vehicle can be quickly determined. This allows a rapid and secure change of the energy store.

The determination unit may comprise systems that can automatically detect the vehicle type. Alternatively, the detection unit may also comprise such systems that utilize a manual input of a user or a readable storage unit in order to determine the vehicle type. The readable storage medium may be applied at the vehicle directly or arranged as a mobile unit.

The data provision unit provides vehicle data depending on the vehicle type. This may occur prior, during, or after the determination of the vehicle type. The data provision device can, for example, access a central server or recall data saved on a local storage medium. Alternatively, the vehicle data can also be recalled from a readable storage medium on which the data regarding the vehicle type is also saved.

The determination device determines from the vehicle data the approximate position of at least one reference point in the coordinate system of the energy store changing device. The measuring means are suitable, based on at least one reference point, to determine the precise actual position of said reference point. From the actual position of the reference point then, the precise position of the vehicle can be determined in the coordinate system of the energy store changing device. The measuring means can be based on various measuring methods, such as optical measuring methods. Preferably, the measuring means are, however, tactile measuring means and in particular, a tactile manipulator.

The tactile manipulator can further be implemented to clean electric contacts of the vehicle, which serve for the electric contacting of the energy store with the vehicle, and/or to lock and/or unlock a lock allocated to the energy store to be changed.

Preferably, the tactile manipulator further comprises a measuring body equipped with at least two contact areas and arranged to be aligned to a contour of the vehicle, with at last one reference point being allocated to said contour. The measuring body is preferably arranged such that it is adjusted to the contours of the vehicle and can be inserted or abutted thereto in a form-fitting fashion, i.e. at least two contact areas can be made to contact matching areas of the contour.

It is generally preferred that the energy store changing device comprises a lifting table, with the lifting table comprising an alignment unit, which is implemented to align the locking and unlocking unit and/or a removal device with regards to the position of at least one energy store in the vehicle, with The locking and unlocking unit being implemented to lock and/or unlock a lock, which is allocated to the energy store to be changed, and with the Removal device being implemented to remove the energy store to be changed from the vehicle and to supply a charged energy store to the vehicle.

A precise and quick positioning can occur by the arrangement of the locking and unlocking unit and the removal device on the alignment unit of the lifting table. The alignment unit is implemented for the purpose to position the components fastened thereon, such as the locking and unlocking unit and/or the removal device, in at least two directions, preferably in the X and Y-direction (thus horizontally). The lifting table is implemented to position the alignment unit in a third direction, preferably in the Z-direction (thus vertically). By the arrangement of the locking and unlocking unit and the removal device on the alignment unit on the lifting table, the processing steps of unlocking and locking the lock as well as the removal of the energy store and the insertion of the energy store can occur directly from the lifting table. Prior to implementing the processing steps, the lifting table can be brought to the desired operating height according to the respective processing steps and can be executed. After conclusion of these processing steps, the lifting table can be lowered. This way, a one-time displacement of the lifting table is sufficient per change process, reducing the time which is necessary to change the energy store. The lifting table can, for example, represent a hydraulic lifting table. The removal device may be a grabber, which is implemented to grab the energy store and remove it from its fixture.

BRIEF DESCRIPTION OF THE DRAWINGS

In the following, exemplary embodiments of the invention are explained in detail with reference to the drawings.

DETAILED DESCRIPTION

Figure 1:
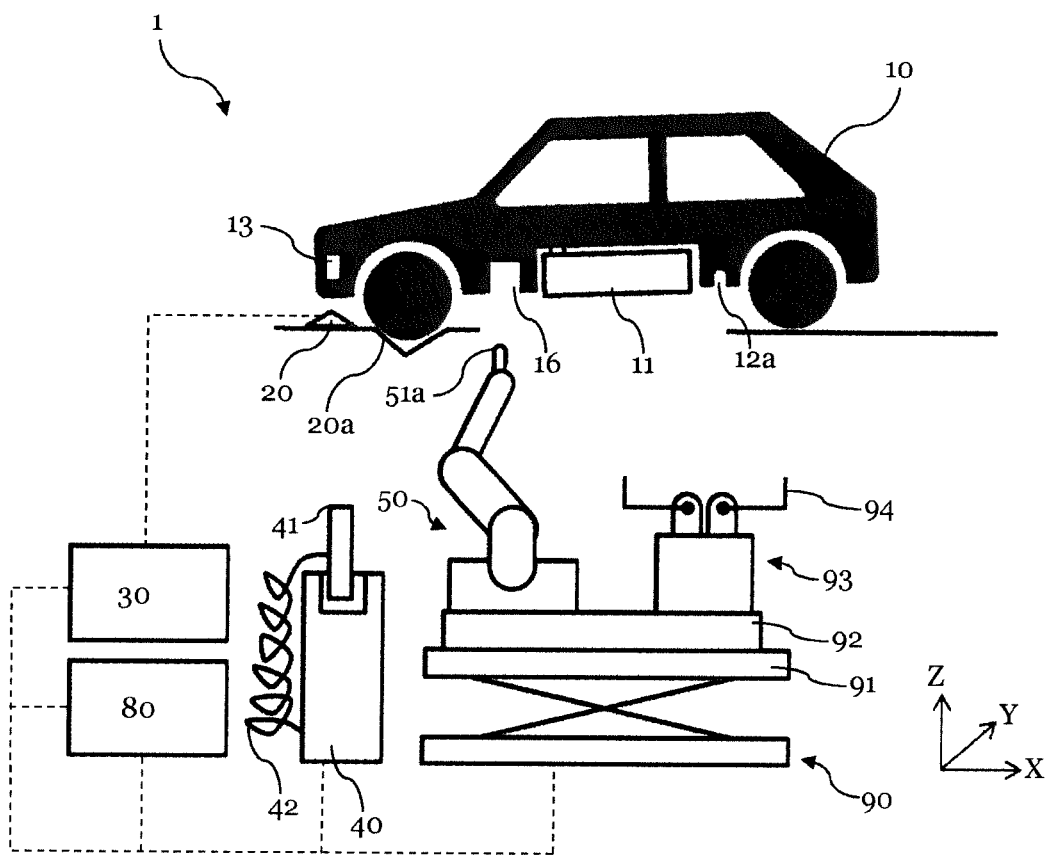
FIG. 1 is a schematic illustration of an energy store changing device.

FIG. 1 shows an energy store changing device 1, which is implemented to change an energy store 11 of a vehicle 10. The vehicle 10 is a vehicle that can be operated electrically and comprises at least one energy store 11. In the present illustration, the energy store 11 is arranged at the bottom of the vehicle 10.

First, the vehicle 10 is moved from a changing site of the energy store changing device 1 until the front wheels of the vehicle abut a mechanic stop 20a, for example. This way, at least the approximate relative position of the vehicle is predetermined in the coordinate system of the energy store changing device. Subsequently, the change process is started. In a first processing step, a determining unit 20 determines the vehicle type of the vehicle 10. In the illustration shown in FIG. 1, the vehicle type is saved on a readable storage medium 13. Preferably, the readable storage medium 13 is arranged at the vehicle. The determining unit 20 determines the vehicle type by reading the storage medium 13. Subsequently, a data provision unit 30, according to the determined vehicle type provides data to the different stations of the energy store changing device 1, as indicated by the dotted lines. These data comprise at least data regarding the arrangement of the energy store 11 in the vehicle 10. Furthermore, a determination device 80 determines, based on the vehicle type, spatial reference points 12a at the vehicle 10.

In order to determine the actual and precise position of the vehicle 10, as shown in FIG. 1, the reference point 12a with a measuring body 51a is approached via a tactile measuring means 50. In the illustration shown, the tactile measuring means 50 is a tactile manipulator.

The change of the energy store 11 of the vehicle 10 occurs via an energy store changing device 90. The energy store changing device 90 shown comprises a lifting table 91, an alignment unit 92, and a removal device 93, which comprises a grabber 94. The lifting table 91 is preferably a hydraulic lifting table and can move the removal device 93 as well as the tactile measuring means 50 in the Z-direction. The alignment unit 92 is implemented for the purpose to position the removal device 93 and/or the tactile measuring means 50 in the X-direction and the Y-direction. With the grabber 94, the energy store 11 can be engaged and removed. The insertion of a new energy store occurs accordingly. Preferably, the alignment unit 92 could also be arranged in a manner rotational about an axis.

In order to allow supplying the vehicle 10, shown in FIG. 1, during the change process with electric energy, the vehicle 10 comprises a connector 16. The connector 16 may receive a plug 41 of an on-grid energy source 40. The plug 41 and the on-grid energy source 40 are connected to each other via a cable 42.

Figure 2:
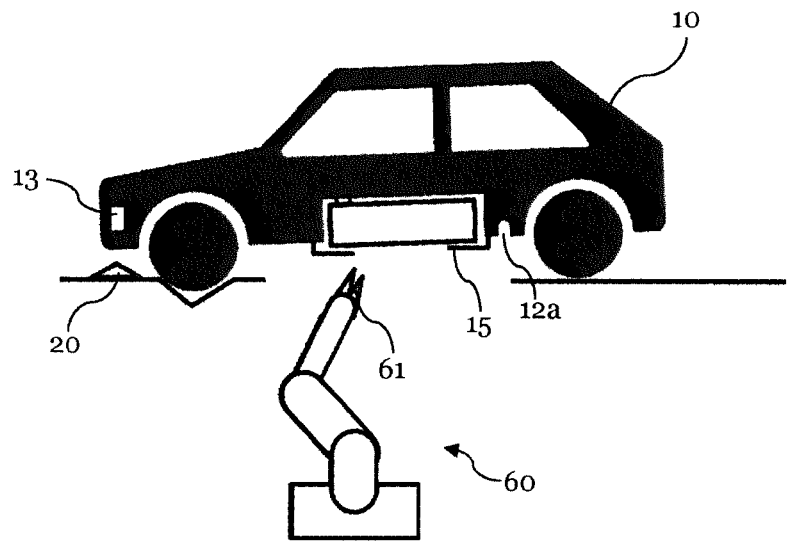
FIG. 2 is a schematic illustration of a locking and unlocking unit.

FIG. 2 shows a locking and unlocking unit 60, which preferably represents a tactile manipulator. Using a locking and unlocking tool 61, the locking and the unlocking unit 60 can release and lock the lock 15 of the energy store 11 of the vehicle 10. Based on the determined position of the vehicle 10 and the arrangement of the energy store 11, as well as based on the vehicle data, the locking and unlocking unit 60 can approach the position of the lock 15 and unlock and/or lock it depending on the type of locking device. In particular, the locking and unlocking tool 61 can be changed based on the type of lock.

Figure 3:
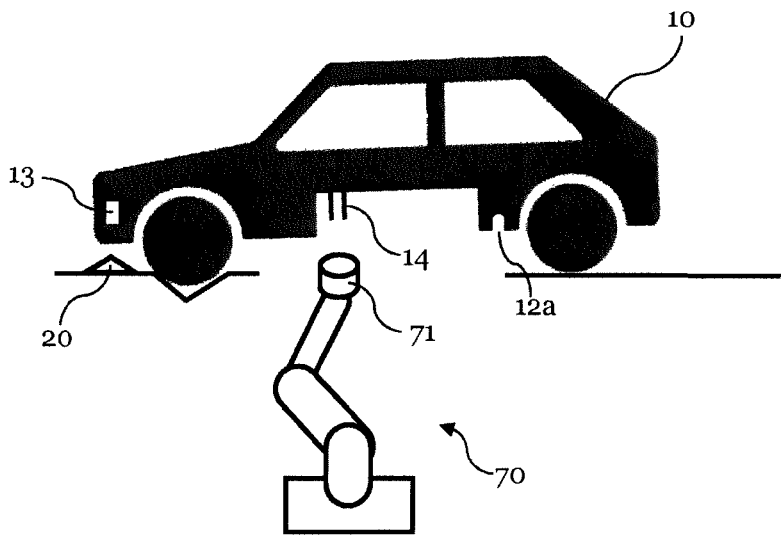
FIG. 3 is a schematic illustration of a cleaning unit.

FIG. 3 shows a cleaning unit 70, which preferably represents a tactile manipulator. Via a cleaning tool 71, the cleaning unit 70 can clean electric contacts 14 of the vehicle 10, serving for the electric contacting of the energy store 11 to the vehicle 10.

It is in particular, preferred that the tactile measuring means 50, the locking and unlocking unit 60, as well as the cleaning unit 70 are integrated in a single tactile manipulator, which is implemented for measuring, locking, and unlocking, as well as cleaning purposes. For this purpose, the tactile manipulator, depending on the application, can accept and put down measuring bodies 51a, 51b, locking and unlocking tools 61, and cleaning tools 71, i.e. it can change, preferably automatically, the tools respectively required.

Figure 4:
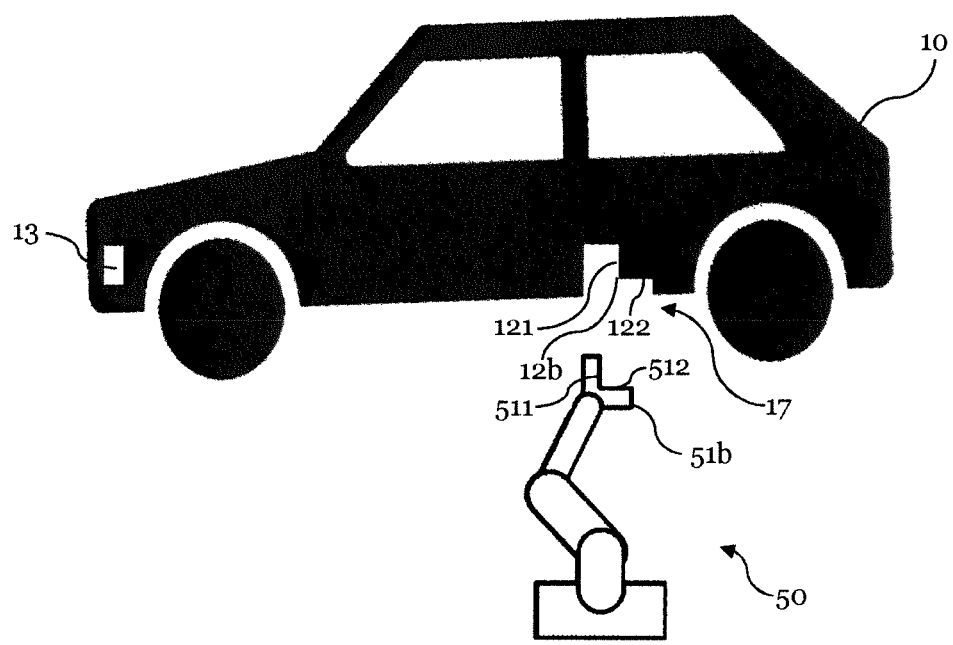
FIG. 4 is a schematic illustration of a tactile measuring means, comprising a measuring body.

FIG. 4 shows a tactile measuring means 50, comprising a measuring body 51b, which is equipped with two contact areas 511, 512. The tactile measuring means 50 serves for determining the current position of the vehicle 10 based on at least one spatial reference point 12b. A contour 17 may be allocated to the reference point 12b, which comprises two areas 121, 122. In order to determine the present position of the vehicle 10, the spatial reference point 12b is approached via the measuring body 51b of the tactile measuring means 50. The measuring body 51b is aligned at the contour 17 to be allocated to the reference point 12b, such that the contact area 511 comes into contact with the area 121 of the contour 17 and the contact area 512 with the area 122 of the contour 17. Preferably, during the approach of the spatial reference point 12b the contacting force is determined, acting upon the measuring body 51b, and this way the correct alignment of the measuring body 51b is determined.

While the present invention has been illustrated by a description of various embodiments, and while these embodiments have been described in considerable detail, it is not intended to restrict or in any way limit the scope of the appended claims to such detail. The various features shown and described herein may be used alone or in any combination. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit and scope of the general inventive concept.

LIST OF REFERENCE CHARACTERS

Energy store changing device 1
Vehicle 10
Energy store 11
Reference points 12a; 12b
Contour areas 121, 122
Readable storage medium 13
Electric contacts 14
Lock 15
Connector 16
Contour 17
Determining unit 20
Data provision unit 30
On-grid energy source 40
Plug 41
Cable 42
Tactile measuring means 50
Measuring body 51a, 51b
Contact areas 511, 512
Locking and unlocking unit 60
Locking and unlocking tool 61
Cleaning unit 70
Cleaning tool 71
Determination device 80
Energy store changing unit 90
Lifting table 91
Alignment unit 92
Removal device 93
Grabber 94
Mechanic stop 20a

The invention claimed is:
1. A method for changing at least one energy storage unit of a vehicle, the method comprising:
  determining the vehicle type;
  providing vehicle data for the determined vehicle type, including data comprising the arrangement of at least one energy storage unit in the vehicle;
  determining spatial reference points on the vehicle based on the vehicle data of the determined vehicle type;

determining the current position of the vehicle based on at least one of the spatial reference points; and changing the at least one energy storage unit of the vehicle;

wherein determining the current position of the vehicle comprises approaching at least one of the spatial reference points with a tactile measuring means.

2. The method of claim 1, wherein the tactile measuring means comprises a tactile manipulator.

3. The method of claim 1, further comprising:

unlocking a lock allocated to the energy storage unit to be changed using a locking and unlocking unit; and locking a lock allocated to a charged energy storage unit using the locking and unlocking unit.

4. The method of claim 3, wherein the locking and unlocking unit is a tactile manipulator.

5. The method of claim 1, further comprising:

cleaning electric contacts of the vehicle using a manipulator, the electric contacts providing electrical contact between the energy storage unit and the vehicle.

6. The method of claim 5, wherein the manipulator is a tactile manipulator.

7. The method of claim 1, further comprising:

connecting the vehicle with an on-grid energy source before changing the at least one energy storage unit of the vehicle.

8. A method for changing at least one energy storage unit of a vehicle, the method comprising:

determining the vehicle type;

providing vehicle data for the determined vehicle type, including data comprising the arrangement of at least one energy storage unit in the vehicle;

determining spatial reference points on the vehicle based on the vehicle data of the determined vehicle type;

determining the current position of the vehicle based on at least one of the spatial reference points; and changing the at least one energy storage unit of the vehicle;

wherein determining the current position of the vehicle comprises approaching at least one spatial reference point with a tactile manipulator, wherein the tactile manipulator comprises at least one measuring body including at least two contact areas, the method further comprising:

approaching the spatial reference point with the measuring body of the tactile manipulator; and aligning the measuring body to a contour of the vehicle allocated to the spatial reference point such that at the least two contact areas of the measuring body come into contact with corresponding areas of the contour of the vehicle.

9. The method of claim 8, further comprising:

determining with the tactile manipulator a contact force between the at least one spatial reference point and the measuring body during the approach of measuring body toward the spatial reference point.

10. The method of claim 1, further comprising:

cleaning at least areas of the vehicle proximate a location from which the at least one energy storage unit shall be removed; and drying the areas before changing the at least one energy storage unit of the vehicle.

11. An energy storage unit changing system for changing at least one energy storage unit of a vehicle, the system comprising:

a determination unit configured to determine the vehicle type;

a data provision device configured to provide vehicle data associated with the determined vehicle type, the vehicle data comprising data regarding the arrangement of the energy storage unit in the vehicle;

a determination device configured to determine spatial reference points on the vehicle based on the vehicle data of the determined vehicle type;

a measuring means configured to determine a current position based on at least one reference point of the vehicle;

an energy storage unit changing unit configured to change the at least one energy storage unit of the vehicle;

wherein the measuring means is a tactile measuring means.

12. The energy storage unit changing system of claim 11, wherein the measuring means is a tactile manipulator.

13. The energy storage unit changing system of claim 11, further comprising at least one tactile manipulator, wherein the tactile manipulator is configured to clean electric contacts of the vehicle which provide electrical contact between the energy storage unit and the vehicle.

14. The energy storage unit changing system of claim 11, further comprising at least one tactile manipulator, wherein the tactile manipulator is configured to at least one of lock or unlock a lock allocated to the energy storage unit to be changed.

15. The energy storage unit changing system of claim 11, further comprising at least one tactile manipulator, the tactile manipulator comprising a measuring body including at least two contact areas and being configured to be aligned with a contour of the vehicle, wherein the contour is allocated to at least one reference point on the vehicle.

16. The energy storage unit changing system of claim 11, wherein the energy storage unit changing unit comprises:

at least one lifting table, the lifting table comprising at least one of an alignment unit configured to align a locking and unlocking unit with respect to the position of the at least one energy storage unit in the vehicle, or a removal device;

wherein the locking and unlocking unit is configured to at least one of lock or unlock a lock allocated to the energy storage unit to be changed; and wherein the removal device is configured to remove the energy storage unit from the vehicle and to supply a charged energy storage unit to the vehicle.

* * * * *